United States Patent [19]

Pinnow

[11] Patent Number: 4,931,789

[45] **Date of Patent: * Jun. 5, 1990**

[54] APPARATUS AND METHOD FOR A UNIVERSAL ELECTRONIC LOCKING SYSTEM

[75] Inventor: Douglas A. Pinnow, Laguna Hills, Calif.

[73] Assignee: Universal Photonix, Inc., Laguna Hills, Calif.

[ * ] Notice: The portion of the term of this patent subsequent to May 12, 2004 has been disclaimed.

[21] Appl. No.: 193,083

[22] Filed: May 12, 1988

Related U.S. Application Data

[63] Continuation of Ser. No. 40,538, Apr. 17, 1987, abandoned, which is a continuation-in-part of Ser. No. 628,517, Jul. 6, 1984, Pat. No. 4,665,397, which is a continuation-in-part of Ser. No. 547,713, Nov. 1, 1983, Pat. No. 4,573,046.

[51] Int. Cl.[5] .............................................. G06F 15/20

[52] U.S. Cl. .......................... 340/825.56; 340/825.31; 340/825.69; 340/825.72

[58] Field of Search ...................... 340/825.56, 825.69, 340/825.72, 825.31, 64, 543, 525; 361/172

[56] References Cited

U.S. PATENT DOCUMENTS

| | | | |
|---|---|---|---|
| 3,024,452 | 3/1962 | Leonard | 340/825.32 |
| 3,029,345 | 4/1962 | Douglas | 70/277 |
| 3,144,761 | 8/1964 | Lee | 70/277 |
| 3,872,435 | 3/1975 | Cestaro | 340/825.31 |
| 4,063,410 | 12/1977 | Welling | 340/348 |
| 4,143,368 | 3/1979 | Route et al. | 340/543 |
| 4,148,092 | 4/1979 | Martin | 361/172 |
| 4,189,712 | 2/1980 | Lemelson | 340/825.31 |
| 4,218,681 | 8/1980 | Hormann | 455/603 |
| 4,275,385 | 6/1981 | White | 340/525 |
| 4,325,146 | 4/1982 | Lennington | 455/604 |
| 4,354,189 | 10/1982 | Lemelson | 340/825.31 |
| 4,532,507 | 7/1985 | Edson et al. | 340/825.56 |
| 4,573,046 | 2/1986 | Pinnow | 340/825.56 |
| 4,663,626 | 5/1987 | Smith | 340/825.72 |
| 4,665,397 | 5/1987 | Pinnow | 340/825.72 |
| 4,686,529 | 8/1987 | Kleefeldt | 340/825.69 |
| 4,692,762 | 9/1987 | Lewiner et al. | 340/825.69 |
| 4,706,085 | 11/1987 | Kudo | 340/825.56 |
| 4,750,118 | 6/1988 | Heitschel et al. | 340/825.69 |
| 4,754,255 | 6/1988 | Sanders et al. | 340/825.69 |
| 4,786,900 | 11/1988 | Karasawa et al. | 340/825.72 |

FOREIGN PATENT DOCUMENTS

| | | | |
|---|---|---|---|
| 0170716 | 2/1986 | European Pat. Off. | 340/825.31 |
| 2082804 | 3/1982 | United Kingdom | 340/825.31 |

*Primary Examiner*—Donald J. Yusko
*Assistant Examiner*—Dervis Magistre
*Attorney, Agent, or Firm*—Bacon & Thomas

[57] ABSTRACT

An apparatus and method for providing a universal electronic locking system (UELS) which controls an actuating device for a lock is disclosed. The system is composed of two elements, a signal-transmitting unit and a signal-receiving unit. The signal transmitting unit transmits one or more encoded signals on electromagnetic carriers. An integrated circuit includes a programmable memory unit such that various codes may be entered and the codes may be changed at any interval desired by the operator. The signal-receiving unit comprises a means for receiving the encoded signals from the signal-transmitting unit and contains a programmable memory unit which is responsive to each and all codes contained in the signal-transmitting unit. Upon changing the code signal in the signal-transmitting unit, the memory unit of the signal-receiving unit may be reprogrammed so as to be responsive to the newly encoded signal and allow the latching mechanism of the lock system to be operated. The system may be used alone or in combination with conventional key operated locking mechanisms. The UELS is contemplated for applications in the home, business industry, recreation, defense and wherever locks and codes are used.

20 Claims, 6 Drawing Sheets

DUAL RADIO/LED OPERATION

DUAL RADIO/LED OPERATION

RADIO OPERATION ONLY

FIGURE 9
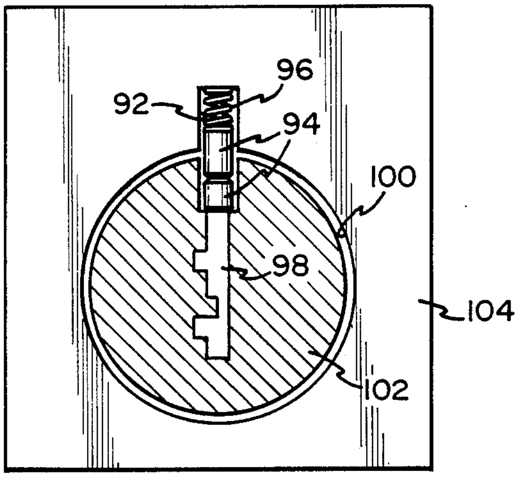
FIGURE 10 a
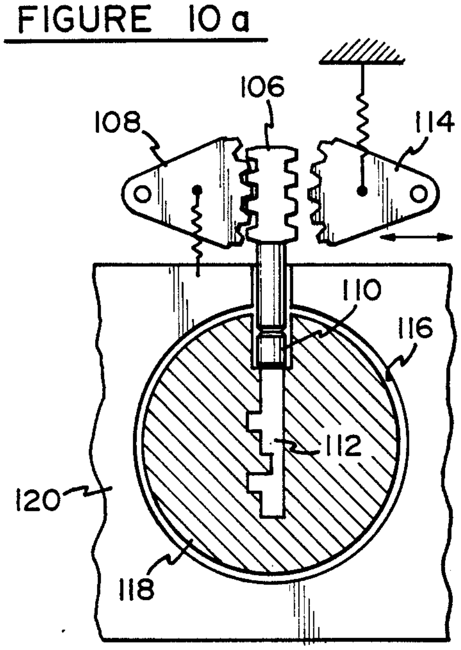
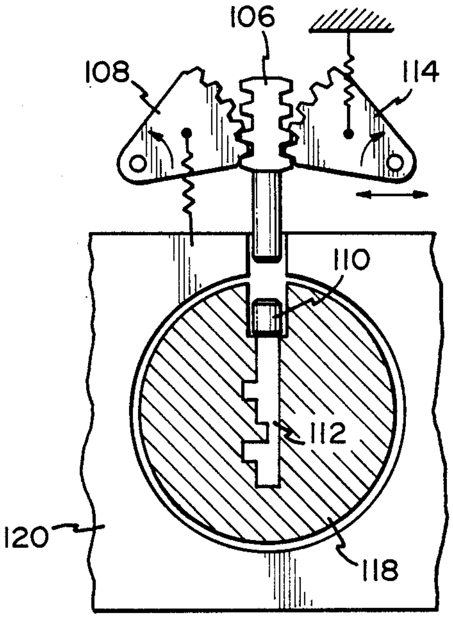
FIGURE 10 b
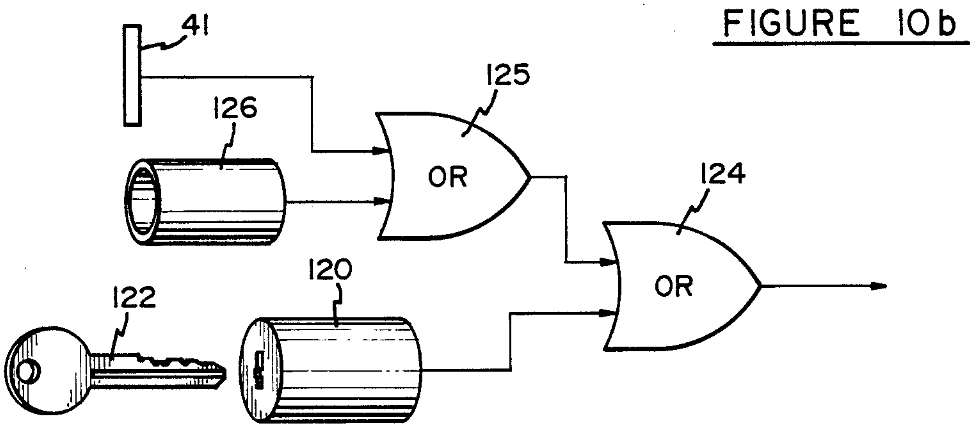
FIGURE 11

APPARATUS AND METHOD FOR A UNIVERSAL ELECTRONIC LOCKING SYSTEM

CROSS REFERENCE TO RELATED APPLICATIONS

This application is a continuation, of application Ser. No. 07-040,538, filed Apr. 17, 1987 now abandoned, which application is a continuation-in-part of copending application Ser. No. 628,517 filed July 6, 1984, now U.S. Pat. No. 4,665,397, which is a continuation-in-part of application Ser. No. 547,713 filed Nov. 1, 1983, now U.S. Pat. No. 4,573,046.

BACKGROUND OF THE INVENTION

The present invention relates to an apparatus and method for an electronic locking system. The system encompasses both a signal transmitting unit and a signal receiving unit for an electronically controlled and electromagnetically actuated locking system to replace the use of mechanical keys and mechanically controlled code locks such as combination locks. This invention recognizes that cost effective electronic and elecromagnetic components can be combined to make a locking system with reliability that exceeds that of purely mechanical locking devices. In addition, the storage of coded key information in a digital format within a portable solid state memory, which may be incorporated in a wrist watch or some similar device, is more convenient than actually carrying a set of keys. This locking system has universal application in home, business, recreation, defense, etc., wherever locks or codes are used.

Several previous systems are known which, through complexity of operation or bulk of transmitting and receiving units, fail to provide the flexibility and ease of operation of the present electronic locking system. Among the known prior art systems is U.S. Pat. No. 3,024,452 which discloses a multi-digit electric door lock. The system amounts to merely an electrical combination lock in which a plate is provided with a plurality of pushbuttons containing the digits zero through nine. After they are manually preset to a combination which will unlock the door, the pushbuttons may then at any time thereafter be actuated in succession with the three digit number to which they were manually preset so as to unlock the door by causing a solenoid to be temporarily energized.

U.S. Pat. No. 3,029,345 discloses an electronic key card system which requires a card B to be inserted in a slot of a control housing 12. In this system, each of the cards is provided with predetermined portions identified at reference numerals 20 and 21 to transmit light from one side of the control housing to the opposite side of the control housing which contains a photodetector circuit. If the predetermined portions of the control card B allow for the light to be transmitted therethrough, the system will unlatch a door lock controlled by a power source.

U.S. Pat. No. 3,144,761 discloses a lock release system which is operated by infrared radiation. The lock release system is manually operated by the rotation of a drive means 32 which moves a chopper disc which has a predetermined amount of material removed from various sections thereof. When the key device is placed to a window of a safe, the manual drive system 32 is rotated so as to move the chopper disc so that, during the moment, light passes through part of the cutaway disc. The output of the key is, therefore, a steady amount of infrared radiation which is interrupted by pulses. The detector, upon the receipt of a preset sequence of signals, unlocks the latching mechanism and allows entry to the safe. This sytem merely allows a constantly energized source of light to be interrupted by a manually rotated disc so as to sequence the light in a predetermined manner.

U.S. Pat. No. 3,872,435 discloses an opto-electronic security system wherein the key apparatus and the lock apparatus are precoded and which does not include an integral electrical power source. The lock device code is preset during the manufacture by hard wiring the components to transmit only a factory-assembled code.

U.S. Pat. No. 4,143,368 discloses a vehicle operator security system in which the driver of a vehicle carries a portable infrared signal generator which is actuatable to generate, selectively, at least two separate digitally coded infrared signals. The locking mechanism, contained in the vehicle, receives the signals, decodes them and actuates an apparatus in response to the first digital code so as to perform a first function such as unlocking a door to the vehicle. The second digital code is received so as to sound an alarm, upon actuation of the operator, at any time the operator perceives a reason for actuating the alarm. The transmitter unit of the locking system is provided with preset code storage means which contain a 14 bit identification code for four different switches. The code storage means are permanently contained in the transmitter.

U.S. Pat. No. 4,218,681 discloses a hand-held transmitter of the type that is well known for controlling the remote movement of garage door installations or like systems. The unit is provided with two different electromagnetic frequencies which can be transmitted as signals after a circuit-actuation pushbutton is turned on.

U.S. Pat. No. 4,325,146 discloses a non-synchronous object identification system which utilizes light-emitting diodes and detectors for supplying coded information to and receiving coded pulses from a device carried in the vehicle which is to be identified.

U.S. Pat. Nos. 4,354,189 and 4,189,712 relate to switch and lock activating systems and method. The patents are related as a continuation and contain the same disclosure. The disclosure relates to a system and method for opening a lock or activating a switch by electronically controlled devices. The device utilizes a finger ring which contains a code recording associated with the crown of the ring. Although the use of a watch is shown in conjunction with controlling a lock, it is to be noted that the watch is to be used in conjunction with a coded finger ring and, therefore, the codes, read by the lock actuating mechanism, are transmitted from the coded finger ring and the watch generates an energy field which is activated only when the ring is disposed within a cavity of the lock-actuating mechanism so that the code contained therein can be read.

My earlier U.S. Pat. No. 4,573,046 is directed to an improved electronic locking system which employs an encoded optical signal to control the latching and unlatching of a lock mechanism.

SUMMARY OF THE INVENTION

The present invention is predicated on my discovery that the system described in my earlier U.S. Pat. No. 4,573,046 can be modified to include electromagnetic transmission and reception of the coded signals at either one carrier frequency or more than one simultaneous carrier frequencies operating in different portions of the electromagnetic spectrum. A principal advantage of this invention is that additional security may be obtained by using more than one and possibly redundant electromagnetic carriers to transmit coded signals which control the latching and unlatching of the lock mechanism.

In a preferred embodiment of the invention, the coded signal is simultaneously transmitted as an infrared coded signal from a light emitting diode or other optical source and as an identically coded radio frequency signal from a radio frequency oscillator.

The system of the invention includes a signal transmitting unit and a signal receiving unit by which one or more electromagnetic signals are transmitted to a receiving unit for controlling the latching and unlatching of a lock mechanism. One or more sources of electromagnetic radiation may be programmed so as to transmit a coded signal or signals through the air to one or more receivers in the signal receiving unit. The signal receiving unit is provided with a memory unit so as to match each received encoded signal with an encoded signal stored in the memory unit of the signal receiving means. A specific feature of the present invention is the elimination of separate and distinct lock operating mechanisms for each lock device. The signal transmitting unit may be incorporated in a wrist-worn device and specifically an electronic wristwatch of the type which utilizes a power source to energize a silicon integrated circuit chip of the type that normally appear in such electronic wristwatches. Alternatively, the transmitter could be incorporated in a pocket, pendant, or pencil watch, etc. Components of the watch, such as the digital display and battery, can serve fual functions, as described in more detail below, for both telling time and opening locks or transmitting security codes. Transmitters may also be made in a form not combined in a watch.

The invention further contemplates that the signal transmitting unit be capable of transmitting a plurality of different encoded signals, each of which may be reset or reprogrammed so as to allow the coded signal to be changed whenever desired. This function could also be integrated into the integrated circuit chip for the watch and be controllable by additional function control buttons provided on the watch in addition to those that are normally required for resetting time, date, etc. The invention also recognizes the fact that the transmission of encoded signals may be accomplished extremely efficiently for many operations without substantially draining the power source of the signal transmitting unit. An additional feature of the universal electronic locking system is that a single lock can be designed to be opened by a multiplicity of different codes. The memory unit of the signal receiving unit can store a large number of codes so that when a specific code is received by the signal receiving unit, a comparator-processor can compare this received code with all valid codes that have been entered in the memory unit of the signal receiving unit. Upon a match of codes, the latching mechanism of the locking system would be opened. This particular multi-code operation may be desirable for locks that are used by many people, for example, by members of a club to open the same lock at a shared clubhouse. Such a system would greatly reduce the number of code categories that are required on each individual's signal sending unit.

Of course, it is recognized that many desirable features can be added to or are part of the universal electronic locking system. For example, for transmitting optical signals the light source may either be a light emitting diode, a semiconductor laser diode or a super radiant light-emitting diode which has the characteristics intermediate between the light-emitting diode and the laser diode. Of course, it is understood that it is preferred to select the most energy efficient combination of power source and photodetector in the signal receiving unit so as to conserve battery power of the signal transmitting unit. In this regard, light-emitting diodes made from aluminum gallium arsenide, with the chemical formula $Al_xGa_{1-x}As$ with the value of x ranging between 0.0 and 0.4, are known to be the most efficient at converting electrical energy in a battery into light energy and are, therefore, preferred. Silicon photodiodes are the preferred type of photodetector based on an excellent spectral match of their detectivity to the emission spectra of the aluminum gallium arsenide light emitter. In addition, the silicon photodiodes are inexpensive and are known to be highly reliable.

It is also recognized that the beam of infrared light emitted from the signal transmitting unit would be in the form of the relatively broad cone of light. Therefore, it may be desirable that the beam be somewhat more collimated by setting a lens in front of the light source.

Additionally, the optical port on the signal receiving unit should be covered with a protective window which is transparent to the infrared beam of the signal transmitting light source. To increase detection of the signal transmitted from the watch, an optical filter may be placed between the window and the photodetector of the signal receiving unit to reject all ambient light except the light in the emission band of the light source transmitting element. This would substantially improve the sensitivity of the photodetector element of the signal receiving unit by eliminating undesirable background light which would cause noise in the detected signal. During normal operation, the light source of the signal transmitting unit would not be activated by the operator until he was within arm's length of the lock. When the light source is activated, the beam would be aimed at the lock by line-of-sight with the eye. Since the light source is activated such a short distance away, this drastically reduces the light source drive power requirements and allows the unit to be utilized in a smaller housing, such as a watch.

Other forms of electromagnetic radiation can be used to transmit the encoded signals from the signal transmitting unit to the signal receiving unit on either one carrier frequency or more than one simultaneous carrier frequencies. Transmission at radio frequencies from a radio antenna at the signal transmitting unit to an antenna at the signal receiving unit is a preferred form of transmission for the encoded signals.

The transmission code format for activating the electromagnetic transmission is selected so as to be effective and efficient. An example of such a format would be to convert the six digit code into a binary bit sequence that is transmitted in a frequency shift key format. The transmission bit rate of either 9.6 kilobits per second or 56 kilobits per second would be convenient because both are standard transmission rates used broadly in telecommunications and computer interconnections.

Also, a protective delay feature could be introduced to the electronic processor in the lock so as to protect it from an unauthorized intrusion by a specifically designed transmission device that would rapidly sequence through all possible code combinations. This protective feature would require a delay of a predetermined time period after the signal-receiving unit received a predetermined number of unauthorized code combinations before it could be addressed against by a transmitter. Accordingly, this would make the time necessary to sequence through all the possible combinations excessively long.

The device also contemplates the use in vehicle applications including automobiles, earth moving equipment, firetrucks, aircraft (both commercial and military), and ships and boats, in which the electronic locks would be powered from the vehicle battery. Such a system would negate the need for separate ignition locks if the doors were always made to lock when shut when using the new universal electronic lock system. In the case of a dead battery, an electrical connector on the exterior of the vehicle could be utilized to receive a standard nine volt transistor battery which could be connected in the circuit so as to reactivate the lock.

For applications where there is more than one entry door, the natural redundancy of the system, when applied to each of the entrances, protects the user from being denied access in the event of a signal component failure in one of the locks. As an example, in apartments with a single entry door, special locks with redundant components could be designed so as to insure continued operation of the lock. The locking system is also contemplated as being provided with indicating means for signalling a component failure. The indicating means could be an audible alarm or indicator light. The lock could be energized by a low-power, low-voltage DC system such as a transformer-rectifier used to power video games. Additionally, the system could employ a low voltage AC electrical power supply. In either case, the voltage would be on the order of 9 to 12 volts. The low voltage and low power makes the system much safer from electrical shock and should not require any special Underwriter Laboratory's approval or building code approval. It is contemplated that on new construction houses the locks could be built into the door frames near the door handle rather than being made part of the moving door. This design would eliminate the complication of powering a lock on a swinging door. For existing houses, it is possible to power replacement locks by using a pair of electronic contacts on the door and door frame that form a mating connection when the door is shut. Another possibility for existing homes would be to make the locks self-powered so that they would not require any wire connections. This would be accomplished by fitting a small electrical generator within the door and actuated by the door handling. In addition to the wired power supply, the lock mechanisms may also be powered by small, long-life batteries. To obtain the maximum lifetime performance from a battery powered lock it would be necessary to add an actuating device on a doorknob or near the door that would be activated so as to power the locking mechanism for a predetermined time period after the actuating device was touched. After this lapsed time, the lock would then automatically cut off the battery power supply so as not to consume any more electrical power until the actuating device was again activated. So as to warn the user that battery life was coming to an end, the lock could be designed to make an audible tone when there was less than a predetermined number of additional possible activations without changing the battery. Of course, it is realized that the main drain on the battery of such a lock mechanism would be to accomplish the mechanical function of latching and unlatching the lock rather than driving the receiver units and the processing electronics. So as to minimize this battery drain, it is contemplated that the energy required to unlatch the locking mechanism would be mechanically stored in a spring that is compressed when the lock is closed. Then only a small amount of electrical power would be required to move a miniature solenoid that would trip the spring and in turn unlatch the locking mechanism. Alternatively, the mechanical energy to unlatch the locking mechanism could be derived from the turning force on a doorknob or handle. In either case, the concept is to design a locking mechanism that uses a very small amount of electrical energy to trigger some substantially larger source of mechanical energy so as to perform the unlatching function. If one desired to open the door in the case where a small electrical generator is employed, the handle would be first moved to generate sufficient electrical energy, stored in a capacitor, to make the lock operative for a predetermined time. The signal transmitting unit is then used to transmit the code to the lock in the manner described below. Additionally, with today's technology for outdoor applications, the lock may be designed to be powered by a small solar cell that is incorporated in the lock. Of course, some capacitive or rechargeable battery storage would be required so that the lock would be functional at night.

To guard against malfunctions of the lock due to a power failure, it is desirable to have some conductor points exposed on the outside of the lock that could connect to a temporary battery to reactivate the lock. Such connections need not be obvious; they can be any two metal parts such as the base of the doorknob and the frame surrounding the optical port.

The universal electronic system may also be used in hotels or other multiple rental units that are controlled from a central desk. The desk clerk would have access to each door lock by a data link such as wire pairs, optical fibers, etc. that permits entry or erasure of a code or resetting the lock so that the next code entered will be added to the lock's temporary memory. When a guest registered for a room the desk clerk would assign the guest a room number and advise the guest that he has just reset the door lock so that it will be activated by the next code received by the guest's transmitter. In a case where the guest does not yet have a transmitter, an inexpensive unit having a minimum of features can be assigned to him for the duration of his visit in the same manner that a key is presently assigned. In addition to the remote reset features just described, the door lock can also be designed so that another code, in addition to the guest code, can be added or deleted from the individual lock memory without interfering with the guest's code. This would permit a maid to gain entry into the room. As is to be understood, all codes could be changed from the front desk at convenient intervals. Carrying the concept of remote setting of a lock code further, in certain secure areas a lock may be remotely set in a programmed fashion for many different authorization situations. For example, a lock can be set to allow access only during 8AM to 5PM working hours, or a code that might open a bank safe at 9AM on January 2nd may be rejected on January 3rd. This mode of operation would be useful in banks and other financial institutions, government agencies, storerooms, data files, etc. An additional useful feature is that actuated locks may report the actuation code to a central process for future reference. An example would be the actuation of a lock to use an office copying machine. Reporting the code could be useful in subsequent charging for service.

The invention also contemplates the use of a hand-held or wrist worn "repeater" device for users of the universal electronic locking system. The repeater would have signal receiving means and memory similar to a lock as well as a signal transmitting unit. The repeater would be of convenience when passing an individual's code to someone else. For example, if an automobile equipped with the universal electronic locking system is left with a repair shop, the appropriate code from an individual's signal transmitting unit could be transmitted to a repeater device that would be used by the repair shop's staff. Two types of repeaters are contemplated by the invention: one would have a digital display of the received code and be used for diagnostics by lock repair men and the other would have no display at all and would be commonly used in garages, hotels, etc., as described above.

It is also recognized that in the transition period before the universal locking system becomes broadly accepted, locks could be provided which can be actuated by both keys and the activation system contemplated by the disclosure.

BRIEF DESCRIPTION OF THE DRAWINGS

FIG. 9 is a representation of a cross section of a conventional key activated lock.

FIG. 10A is a representation of a cross section of a conventional key activated lock adapted to be activated by an electromagnetic signal.

FIG. 10B is a representation of a cross section of a conventional key activated lock also adapted to be activated by an electromagnetic signal.

FIG. 11 is a representation of a locking mechanism having dual unlatching capacity which employs electronic rather than mechanical parts.

DETAILED DESCRIPTION OF THE PREFERRED EMBODIMENTS

Figure 1:
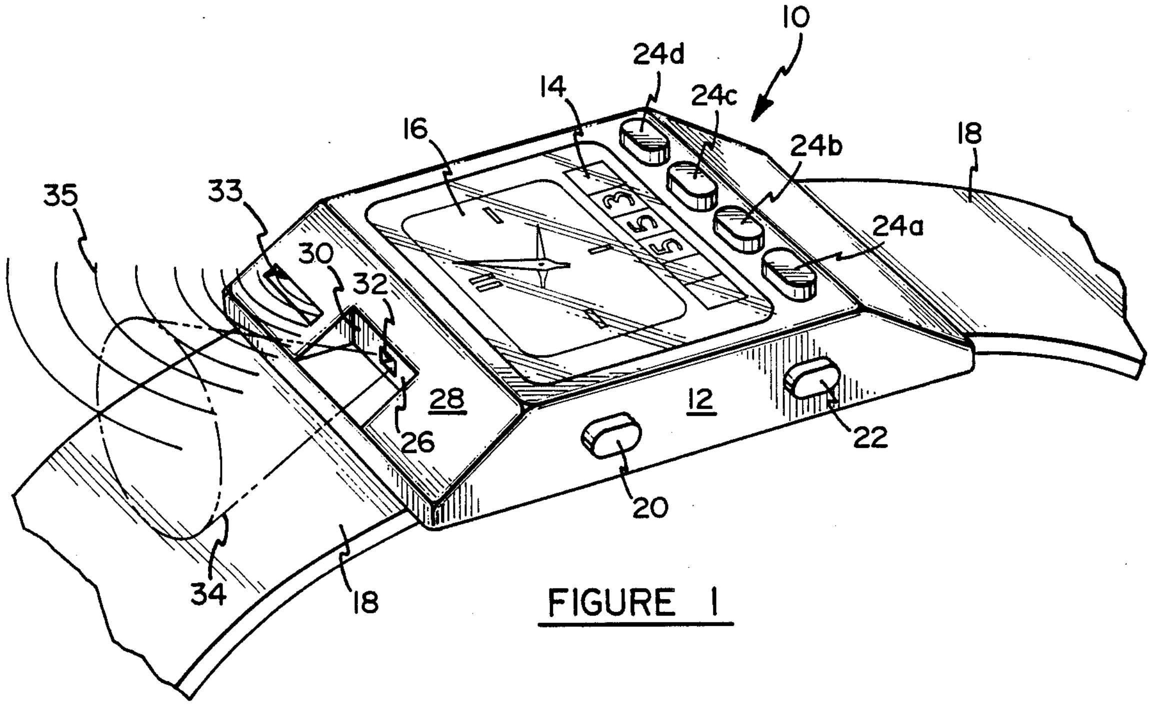
FIG. 1 is a representation of the lock actuating signal transmitting unit incorporated into an electronic wristwatch.

Referring to FIG. 1, the signal transmitting unit, indicated generally at 10, is incorporated in an electronic wristwatch 12 which is provided with a digital display of time 14 and an optional analog time display 16. The watch is shown attached to a wristband 18 but it is to be understood that the band is optional and that the device could well be incorporated into a pocket, pendant or pencil watch or watches which would be worn in various other ways as well as in a housing which is not a watch. The electronic watch would be provided with a time reset or display illuminator indicated at reference numeral 20 and a function control key for time and code reset as indicated at 22. The function control key for time reset would function in the well known manner of any electronic watch and the function for code reset will be explained in more detail below. Additionally, the watch is provided with a plurality of code keys at 24 which transmit a preset coded signal from the watch to a signal-recieving unit for unlatching the lock mechanism to be described below. It is noted that while four code keys are shown, various numbers of code keys could be provided so as to transmit an actuating signal to the latching means of the signal receiving unit for controlling the latching mechanism for various locking systems such as at the home, office, recreational areas and automobiles.

A port 26 is provided in the top, end face 28 of the watch. The port provides a window 30 for the light source 32 contained in the watch. As previously discussed, this light source may be one of various types which may be powered by the battery and electronic circuitry contained within the electronic watch. Reference numer 34 indicates the light-emission pattern from the light source and clearly shows the cone-type projection previously discussed. The cone-type emission pattern 34 from the light source 32, contained in the watch, transmits the coded optical signal through the air to a protodetector contained within the signal receiving unit discussed below. The top location of part 26 is convenient for the user so he can visually align the emission pattern 34 towards the receiver by sighting in the 12 o'clock direction. Radio antenna 33 is also provided in the top, end face 28 for emitting a radio frequency signal. Unlike the light beam, the radio signal diverges from the antenna with spherical wavefronts 35 travelling in all directions.

Regardless of the number of code keys 24, each may be preset to a desired numerical sequence code in much the same manner that the time or date is presently set into an electronic watch. The code keys 24 are located, for convenience, on the lower front edge of the watch 23. They can be depressed by the user's index finger without interfering with the visual alignment of the emission patterns 34 and 35. The separate function control key 22, on the side of the watch, is sequentially depressed to reset time, date and possibly some alarm time. The control key 22 would then be sequentially depressed again so as to control or indicate a code key 24 which is to receive a locking code. For example, if the first code key 24a is to be reset, the function control key 22 is depressed until a "Cd 1" appears on the watch's digital display. The symbol "Cd" would be an abbreviation for the term "code". Once this occurs, the user will note that he is in the mode to reset a new code by use of the code key 24a. Upon the appearance of the "Cd 1", a multidigit code of, for example, six digits, can be entered by depressing the code key 24a causing the next digit on the display to sequentially roll until the code key 24a is released. The sequential roll would be through the digits, 1, 2, 3, 4, 5, 6, 7, 8, 9, and 0 until the code button is released. Upon release of the code key 24a, the digit which is shown in the digital display would be stored in the memory of the electronic watch. The same code key 24a would then be depressed again until the second digit is selected from the rolling display discussed above. Again, upon releasing the code key 24a, the indicated digit is then committed to the memory unit provided in the electronic watch. This process is repeated until the entire six digit code is entered.

Figure 1A:
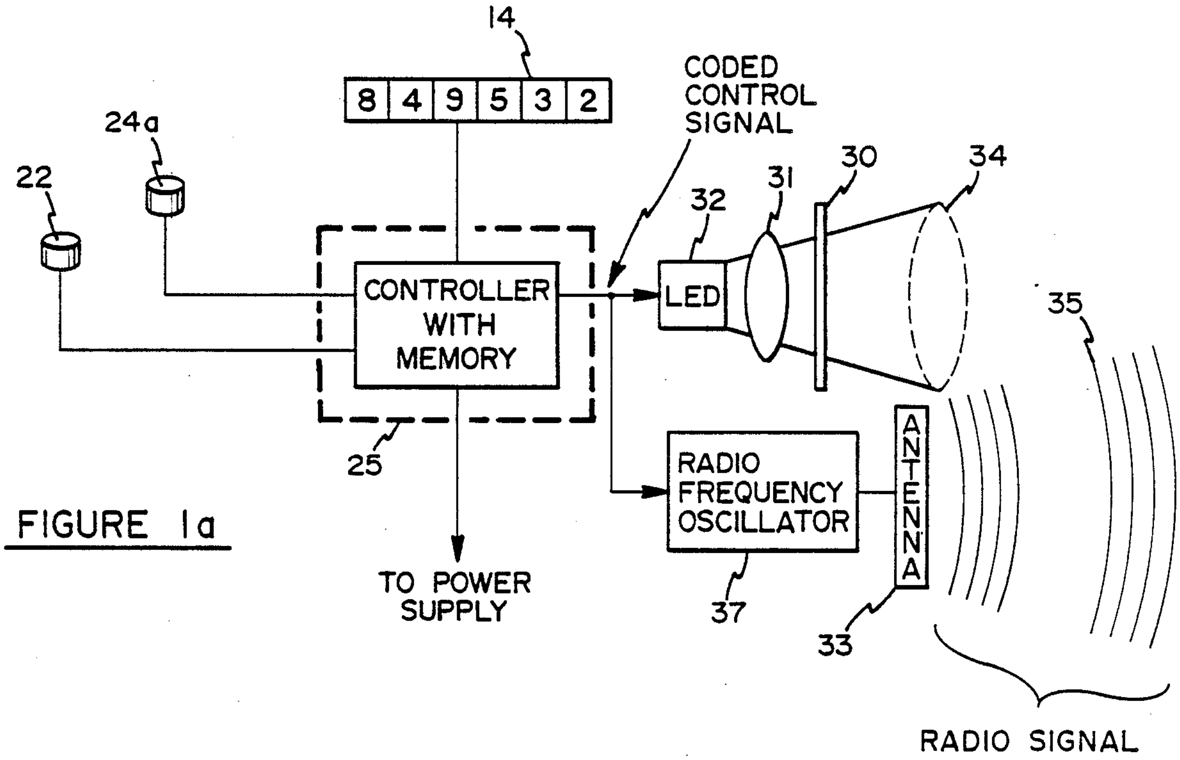
FIG. 1A is a further representation of the lock actuating signal transmitting unit depicted in FIG. 1.

Referring to FIG. 1A, it is seen that logic functions required to enter the code and subsequently activate the light source, upon command, are all integrated into a silicon integrated circuit ship 25 which also contains the function systems of the electronic watch. FIG. 1A also shows the disposition of lens 31 in front of the light source as previously described as well as radio frequency oscillator 37 which generates the coded radio frequency signal upon receipt of the coded control signal from integrated circuit chip 25. The oscillator output is directed to antenna 33 which broadcasts the coded radio signal.

A six digit code is selected so as to enhance the security of the locking system, since the probability of a random coincidental activation would be one in a million. This would provide excellent security against unauthorized opening of the latching unit in the signal-receiving unit. The process for setting a code just described, would be repeated for each of the code keys 24b, 24c and 24d with each code key requiring, in the example given, a six digit number. Of course it is to be understood that the number of digits embodied in the code could vary depending upon the degree of security required in the locking system and the memory capability contained within the silicon integrated circuit chip. The transmission code format for activating the light source is selected to be effective and efficient. An example of such a format would be to convert the six digit code into a binary bit sequence that is transmitted in a Frequency Shift Key (FSK) format. While this is but one example, the invention is not to be considered so limited and other formats may be utilized.

In a further embodiment of the invention, one of the code keys 24 could be adapted as a fixed code key which, when depressed, would cause a standard emergency signal to be transmitted which would be received by any standard emergency receiver in the area. Alternatively, the transmitter could be designed so that the standard emergency code would be transmitted when two or more code keys 24 are simultaneously depressed. Thus, the fixed "emergency" code key function would enable a person to signal for emergency assistance in situations where it was not possible to reach a telephone such as during a robbery or unexpected incapacitating illness. The intensity of the emergency signal could be much greater than a key code transmission to cover a greater distance to an emergency receiver.

As depicted in FIG. 1 and FIG. 1A, the signal transmitting unit employs dual radio/optical transmission. The same coded control signal is used to control the optical source as well as the radio frequency oscillator. By using two electromagnetic carriers for the encoded signal operating in different portions of the electromagnetic spectrum, additional security is obtained.

Figure 1B:
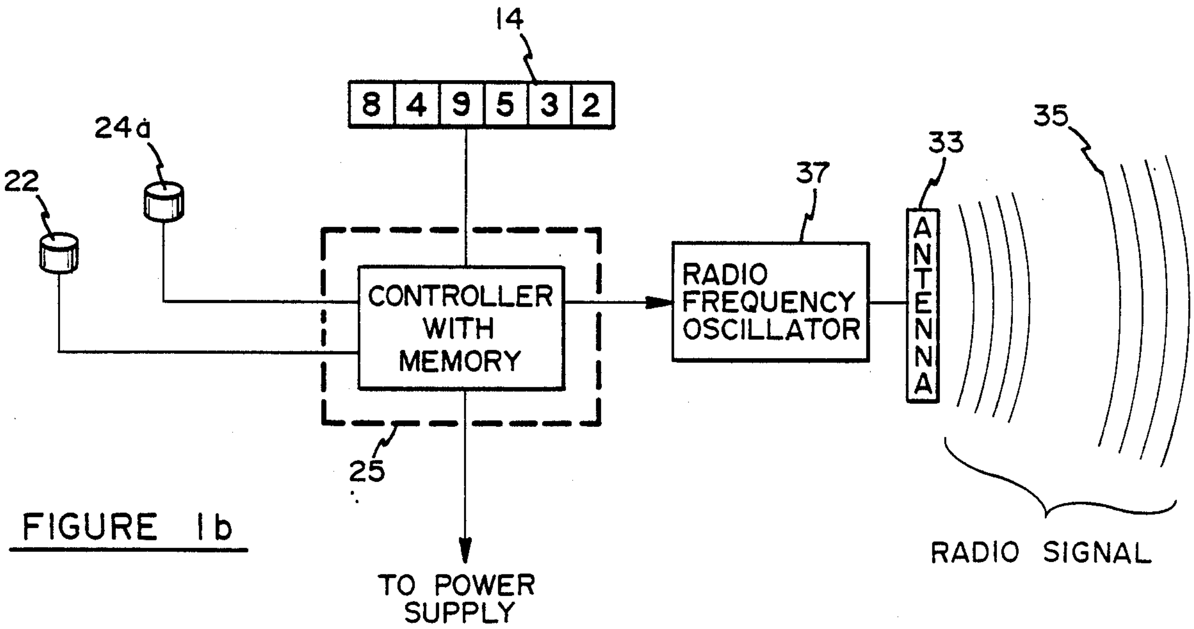
FIG. 1B is a representation of an alternative lock actuating signal transmitting unit.

FIG. 1B shows an alternative embodiment of the invention in which only a radio frequency signal is used to transmit the encoded signal to the signal receiving unit. In this case, the optical source lens and optical port are simply eliminated in favor of radio frequency oscillator 37 and antenna 33.

Figure 2:
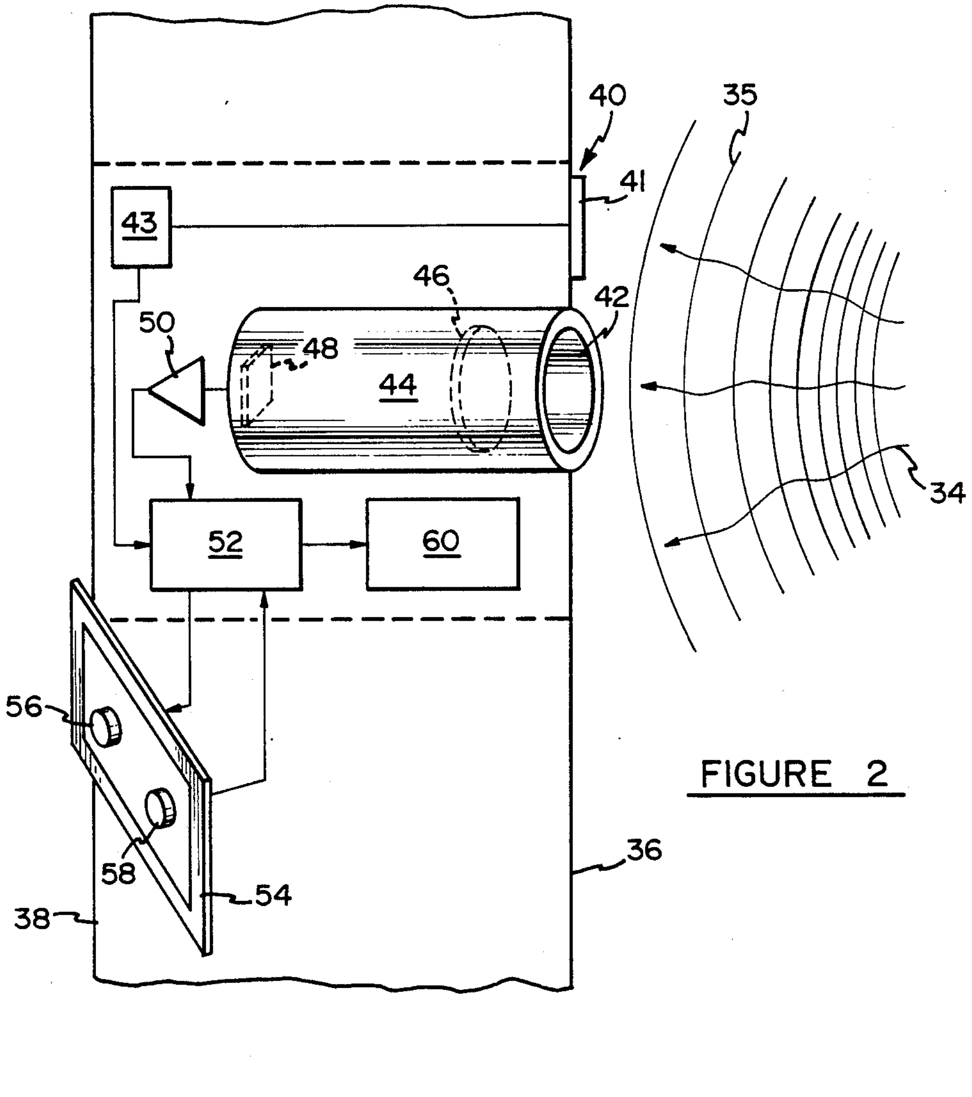
FIG. 2 is a representation of a lock actuating signal-receiving unit and latching mechanism contained within a door or door frame.

FIG. 2 discloses the details of the signal-receiving unit which is located in a door or door frame. The system is indicated generally by reference numeral 40. Also, for purposes of illustration and explanation only, the side of the door frame 36 is considered to be on the outside of the door or enclosure and reference numeral 38 indicates the interior of the enclosure to be protected by the locking system 40. Reference numeral 42 indicates the window of a photodetector structure indicated at reference numeral 44. A band pass filter, indicated at 46, is situated between the window 42 and the silicon photodetector 48. The filter is designed to reject substantially all ambient light except the light in the emission band 34 of the light source 32 in the signal-transmitting unit 10. This considerably improves the sensitivity of the photodetector 48 by eliminating undesirable background light which would cause noise in the detected signal. It is also within the scope of the invention to have the photodetector 48 substantially recessed behind the protective window 42 and have the walls of the tubular cavity 44 leading to the photodetector 48 covered with an optically absorbing material. In this case, light from the signal-transmitting unit would pass straight through to the photodetector 48 while only a small fraction of the ambient light would have rays that would follow essentially the same path to the photodetector 48. An alternative receiving structure may employ an optical fiber to relay a portion of the signal transmitted from the light emitter to the photodetector. A band pass optical filter placed either in front or after the fiber would be beneficial to reject background light. The use of a fiber relay is particularly beneficial in situations where the lock mechanism may be a substantial distance from the point where access is desired. For example, a fiber optic relay would be useful for opening a garage door without requiring an automobile operator to get out of his vehicle to establish close proximity to the lock mechanism. Downstream of the photodetector 48 is an amplifier 50 which serves the usual function of amplifying the detected signal before transmission to the signal processor 52.

Radio antenna 41 is disposed adjacent window 42 in the door or door frame. The antenna collects encoded radio signal 35 and directs it to radio receiver 43. The radio receiver changes the radio signal to an electric signal which it directs to signal processor 52.

Located in the interior 38 of the enclosure desired to be locked is a programmable memory unit 54 provided with two control keys 56 and 58. The control key 56 may be actuated to operate the unit and the control key 58 may be actuated to program the memory unit. When the program control key 58 is actuated, the next code received by the photodetector and radio receiver will be entered in a non-volatile electronic memory chip within the memory unit. In this instance, the term "non-volatile" means that the code will be retained in the memory unit even if electrical power is temporarily lost. The most common type of "non-volatile" memory is the well known electronically programmable read only memory (EPROM). These silicon chips allow the user to load a limited number of bits into a non-volatile memory. Once a bit is loaded, however, it can never be changed, although the bit can be ignored and a new bit can be electronically entered. In time, the memory capacity of the EPROM, typically 4,000 to 64,000 bits, will be fully consumed and the chip becomes unusable. This type of memory would be satisfactory for the signal transmitting and receiving units of the invention because a typical six digit code requires only twenty bits of memory capacity. With a 4,000 bit EPROM, the codes could be changed up to 200 times while the larger capacity EPROMs would accommodate 3,200 code changes.

More recently, there has been developed electronically erasable programmable read only memory (EEPROM or $E^2PROM$) which can be reused, but thus far these chips have been found to operate too slowly to be used as the main memory in the signal transmitting and receiving units of the invention.

Even more recently, non-volatile random access memories (NVRAMs) have been developed that combine a conventional high speed volatile memory with a back-up $E^2PROM$ that is loaded with the volatile memory data in case of a loss of power. Such NVRAMs are manufactured by Intel Corporation under the designation 2004. Although the memory capacity of the 2004 is substantially in excess of the capacity need, the NVRAM technology is the preferred choice for use in the signal transmitting and receiving units of the invention.

A still further way to insure that memory is not lost due to a power failure is to include two power sources in all transmitting and receiving units. One power source would function as the primary power source while the second would function as a back-up power source that would be automotically cut in if a low voltage signal was sensed in the primary source. An audible alarm can be included in each unit to alert the user of the failure of the primary power source when the transmitting or receiving unit is activated.

When a new code is desired to be entered in the sign-transmitting unit 10, it is entered in the manner previously described. In order for the signal-receiving unit to be responsive thereto, the control key 58 is actuated and the new code is transmitted to the memory unit 54 and entered in the memory chip. The control key is then deactuated so as to deny access to the memory unit. When the operating key 56 is then actuated, and the code which was previously transmitted and stored in the memory of the memory unit 54 is received by the photodetector and radio receiver, the processor will automatically compare the received code with the one stored in the memory. If the codes are identical, the processor 52 will instruct the electromechanical latch 60 to open and allow ingress to the enclosed area 38.

Accordingly, a significant feature of the electronic lock system is that locks can be designed to be opened by a multiplicity of different codes. All valid codes may be entered in a fashion similar to that described above and stored in the memory unit 54. When a code is received in the memory unit 54 and the unit is in the operate mode, the processor would compare the received code with all valid codes that were previously entered in the memory unit 54. If the received code matches any one of the codes contained in the memory unit, the electromechanically operated latch 60 would be operated and opened by the processor 52. Of course, the memory unit 54 and access keys 56, 58 would be covered by a plate, not shown, when not in use. To enhance security, the processor is programmed to require receipt of valid codes from both the photodetector and the radio receiver before enabling the electromechanically operated latch in systems employing a dual radio/optical signal transmitting unit in the manner depicted in FIG. 1A. In systems employing only one form of electromagnetic radiation to transmit the encoded signal, only one receiver is required in the signal transmitting unit and the processor need only be responsive to one signal from the receiver.

The above-described multi-code operation is particularly desirable for locking systems that are used by a large number of people. For example, many members of a club may use their private codes to open the same lock at a shared clubhouse. This would greatly reduce the number of code keys required on each individual's watch. Additionally, all locks will fall into two categories, i.e., single code locks and multi-code locks. The single code locks will be the least expensive and their memory units will have only the two operators 57, 58 previously discussed. The multi-code locks will have three or four operators for programming the memory unit 54 to receive a code from memory, putting the latching means in an operating mode, deleting codes from the memory unit and possibly for clearing all codes. While the multi-code lock is not illustrated, it is clearly within the concepts of the invention.

In some instances it may be desirable to include a single random code in an unalterable read only memory (ROM) at the time of manufacture to preclude the possibility of having to destroy a lock to open it if the lock were inadvertently secured and the operating code lost. The single random code would not be disclosed to the purchaser, installer or anyone else coming in contact with the lock, but would be retained by the manufacturer. Thus, the lock could be opened after the manufacturer satisfied itself that the party requesting the code was entitled to receive it to open the lock.

Figure 3:
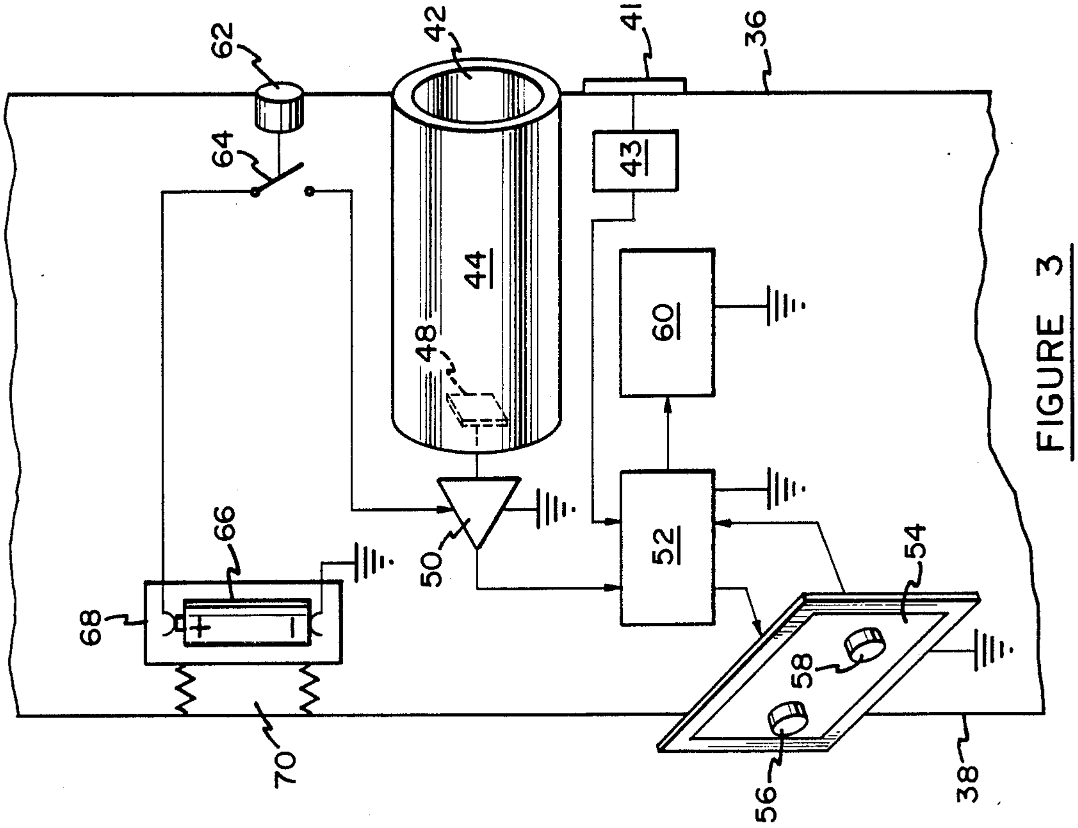
FIG. 3 is a representation of another lock actuating signal-receiving unit and latching mechanism contained within a door or door frame.

FIG. 3 depicts a further embodiment of the signal-receiving unit illustrated in FIG. 2 having a secondary, self-contained electrical system in case of failure of the primary system. In the event of failure of the primary electrical system, activator button 62 is depressed, which closes switch 64 thereby connecting the secondary power source 66 to the primary system through amplifier 50. The secondary power source is typically a battery. The battery is housed within a compartment 68 in the same enclosure as the primary system which is provided with removable cover 70 for battery replacement.

Figure 4:
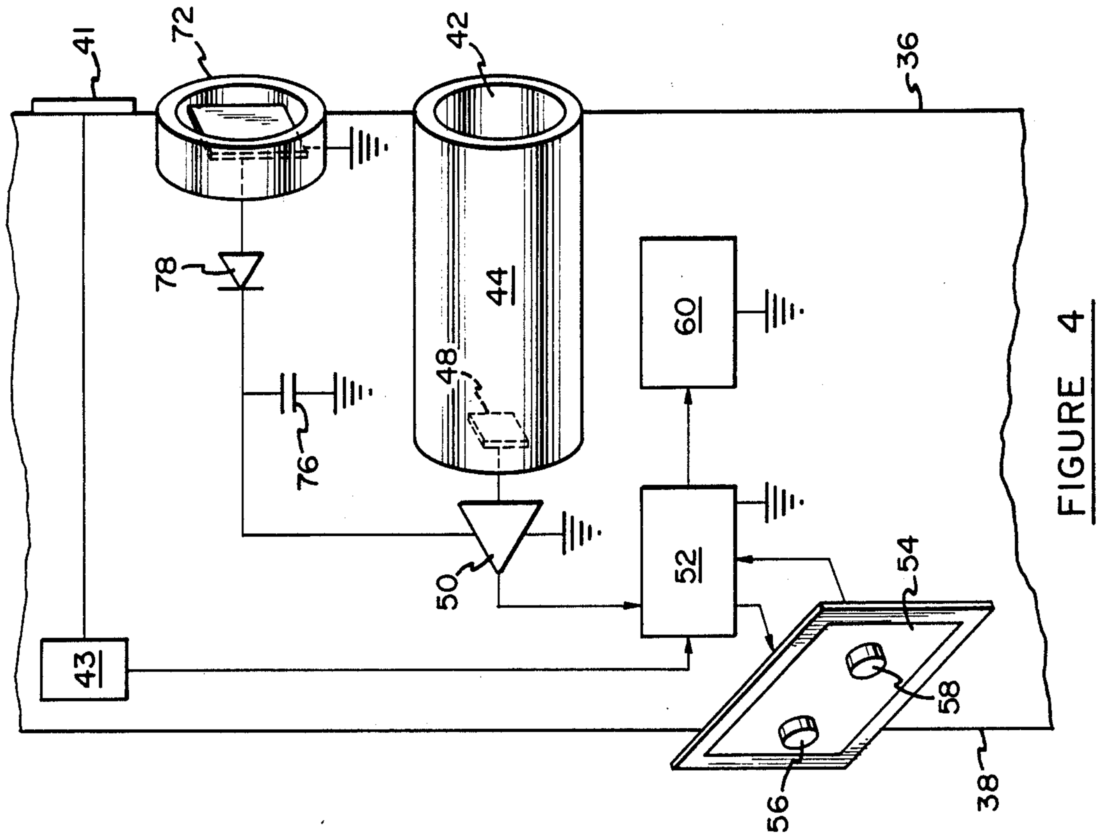
FIG. 4 is a representation of a solar powered lock actuating signal-receiving unit and latching mechanism contained within a door or door frame.

A solar powered signal-receiving unit is shown in FIG. 4. Sunlight enters the unit through solar port 72 and is received by solar cell 74, which transforms the solar energy into electrical energy to power the system. Capacitor 76 or a rechargeable battery is provided to store the electrical energy so that the system can operate in periods of darkness or low light. Diode 78 is provided between the solar cell and the capacitor to prevent the charge stored in the capacitor from discharging through the solar cell during dark periods.

Figure 5:
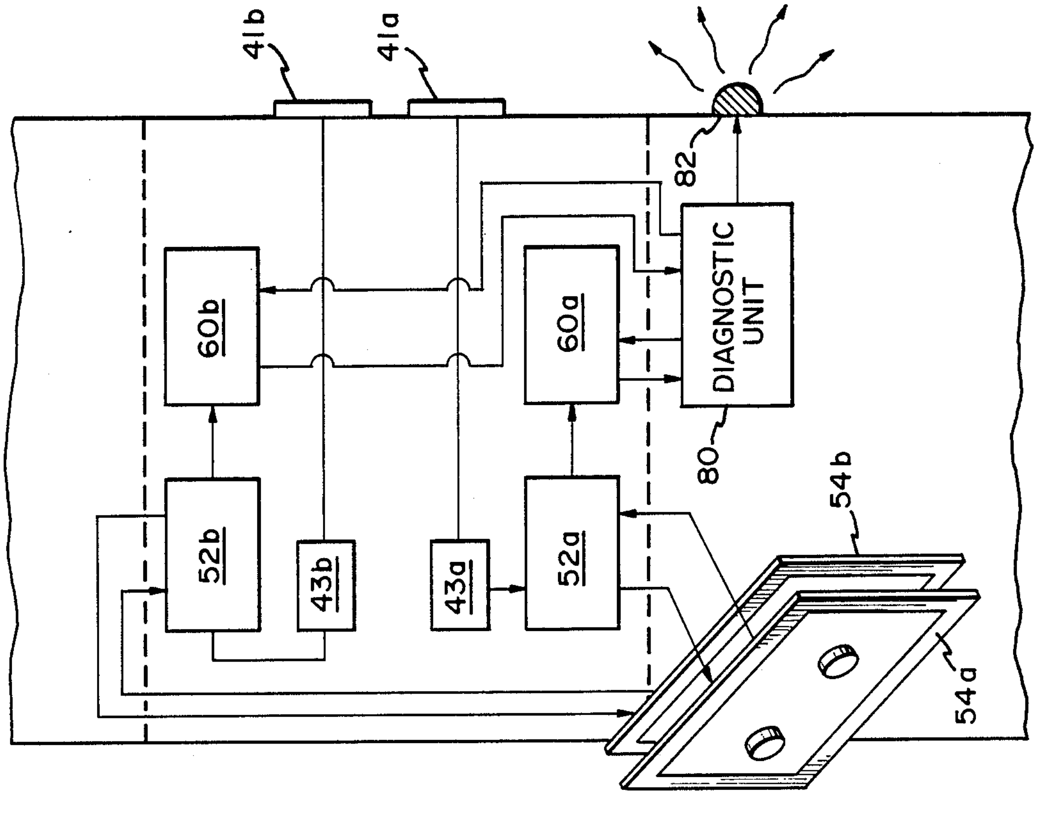
FIG. 5 is a representation of a lock actuating signal-receiving unit and latching mechanism contained within a door or door frame and having redundant components and component failure signalling means.

FIG. 5 illustrates a signal-receiving unit containing redundant components as a safeguard against failure of the primary components in a radio frequency controlled system. In this unit the primary components are labelled with reference numeral "A" and the redundant components with the corresponding "B" reference numerals.

In addition, the unit contains diagnostic unit 80 connected to both the primary and redundant systems. If either electro-mechanical unit 60A or 60B receives an instruction to open, it will report this to the diagnostic unit 80. In normal operation, the diagnostic unit will receive simultaneous signals from both electro-mechanical units 60A and 60B. In the event of a component failure, the diagnostic unit will only receive one signal from either unit 60A or 60B. This will trigger the diagnostic unit to actuate alarm 82 as well as the unactuated electro-mechanical unit so that the lock may be opened.

Figure 6:
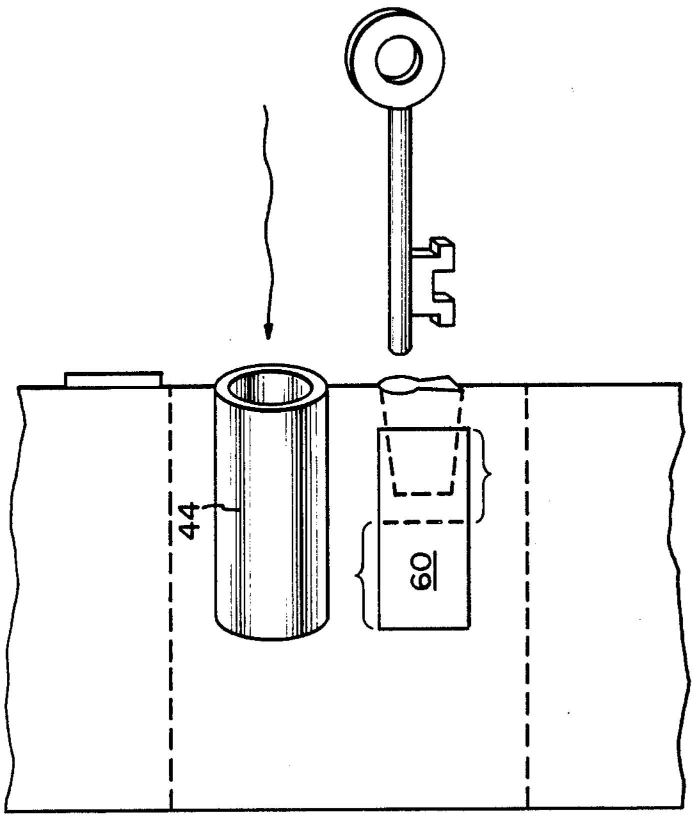
FIG. 6 is a representation of a lock actuating signal-receiving unit and latching mechanism contained within a door or door frame which can be actuated by both optical and radio signals and key.

FIG. 6 shows an embodiment of the invention in which the signal receiving unit is modified so that the lock may be opened by a key. The key is designed to activate the electro-mechanical unit 60 which opens the lock. Further details regarding specific embodiments of this concept are discussed below in relation to FIGS. 9–11.

Figure 7:
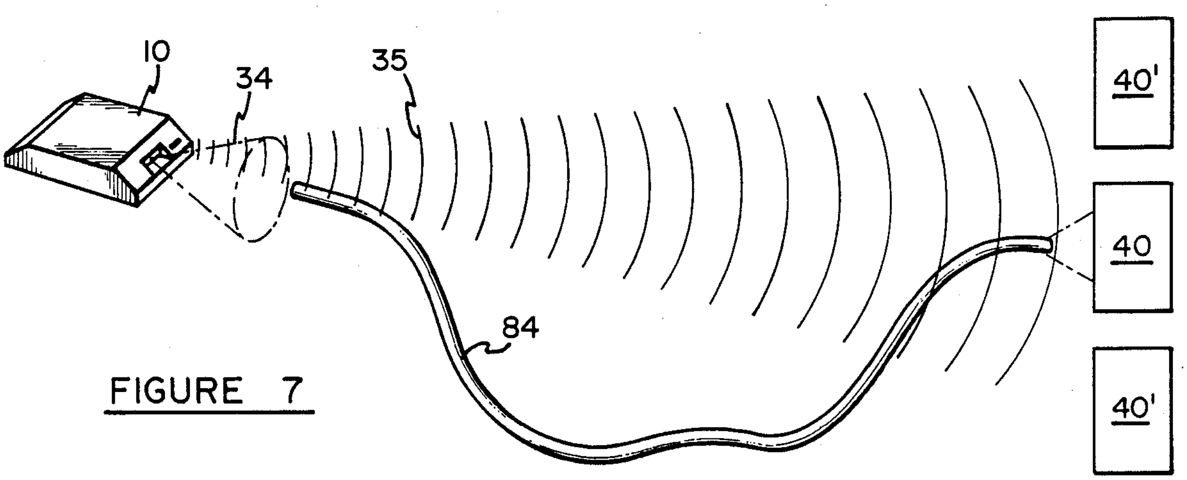
FIG. 7 is a representation of a fiber optic transmission link for transmitting different encoded signals.

FIG. 7 shows a typical fiber optic transmission relay for use in conjunction with the invention. The relay is comprised of optical fiber 84 which recieves the optical signal which is emitted from the transmitting unit 10 in a coneshaped pattern 34. At the other end of the optical fiber, the optical signal exits the fiber in the same coneshaped pattern and is received by optical receiver in the lock actuating signal-receiving unit 40. FIG. 7 also shows the transmission of encoded radio signals 35 from the transmitting unit 10. As previously described, this signal could be a fixed "emergency" code which is received by any one or more of several standard emergency receivers 40' in the area.

Figure 8:
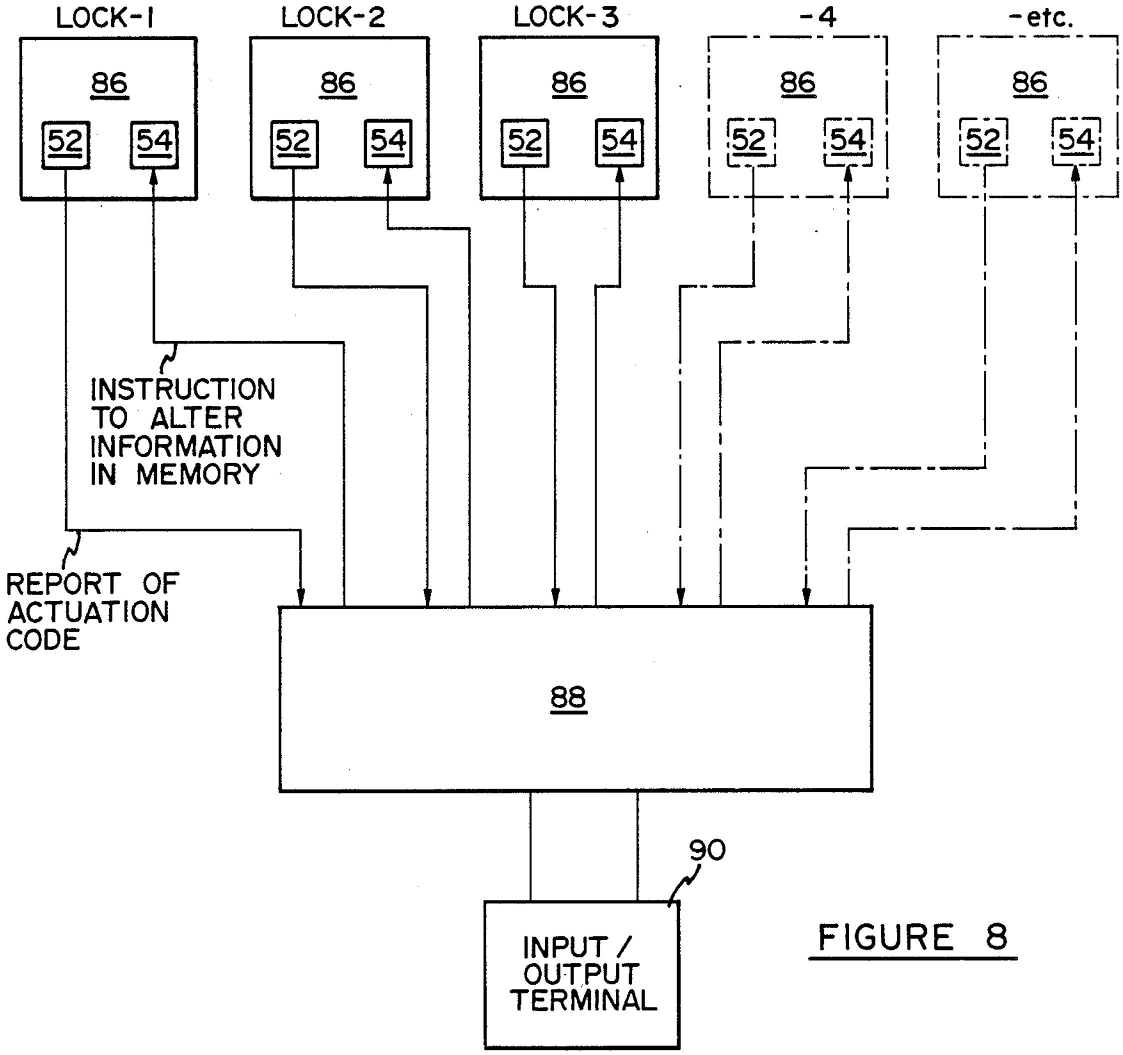
FIG. 8 is a representation of a group of remote lock actuating signal-receiving units and latching mechanisms which report actuation to a central processor.

Finally, FIG. 8 shows a further embodiment of the invention in which a plurality of remote locking units 86 are connected to a central processor 88. In this manner, each remote locking unit can be continuously monitored and controlled by the central processor. As previously described, this embodiment is particularly useful in hotels or other multiple unit structures since it permits individual control of each locking unit from a central location using a data input/output terminal 90. In this manner, each remote lock can be connected to a central security system. For example, upon receipt of a valid code by a lock, a signal is relayed to a central processor which automatically deactivates the security system for the premises. However, unless the security system is deactivated in this manner, an alarm is sounded and transmitted to the appropriate security personnel when the lock is opened.

FIGS. 9, 10A and B and 11 illustrate specific embodiments for locking systems, activated by either an encoded signal or a standard key.

FIG. 9 shows a cross section of a standard lock activated by a key. The lock has a vertical row of openings 92, generally four to six, each containing two small pins 94 referred to as tumblers and a spring 96. When the correct key is inserted into key slot 98, the pair of tumblers is pushed up against the spring so that the parting line between the two pins is positioned at the annular space 100 formed between the cylinder 102 and the fixed housing 104. Tumblers of various lengths are chosen so that the key must have a particular profile to simultaneously lift all locking pins to position the parting line in annular space 100. When this is accomplished, the key can be turned and the cylinder 102 will rotate within fixed housing 104. In turn, a mechanical linkage (not shown) will open the latch.

To modify such a lock to be activated either by a transmitted encoded electromagnetic signal or by a key requires special design considerations. For example, the design must permit the unlatching function activated by the transmitted electromagnetic signal to perform independently of the cylinder operation. Otherwise, an electromagnetic signal and key would be required to open the lock.

FIGS. 10A and B depict one way to accomplish independent activation of the unlatching function by a transmitted electromagnetic signal. During idle periods the lock is configured as shown in FIG. 10A. The upper locking tumblers 106 are still spring loaded by a series of gripping means or cams 108 to bear down on the lower tumblers 110. If a key is inserted in this lock through key slot 112, it functions in a conventional fashion. However, if a valid code is received by the lock, another cam or comparable gripping means 114 swings in to engage all upper tumblers 106, as shown in FIG. 10B, and lifts them above the annular space 116 between the cylinder 118 and fixed housing (not shown). The cylinder 118 is then free to rotate even though the lower tumblers have not moved.

In cases where the lock is dependent upon battery power for its operation, the receipt of a valid optical code by the signal receiving unit causes the lock to be opened by an internal battery driven escapement mechanism, e.g., a small pin, lever or wheel, which causes a chain sequence of mechanical parts to move under the hand power of rotating the doorknob or an auxiliary knob. This chain sequence is designed to minimize battery drain in accomplishing the escapement function by taking full advantage of human power in performing the unlatching. During the chain sequence gripping means 114 first swings in to engage the upper tumblers 106 and lifts them. The final step in the mechanical sequence is the rotation of the cylinder, also accomplished by human power.

FIG. 11 depicts a further mechanism for providing the dual unlatching capability in accordance with the invention, employing an electrical switch rather than a series of mechanical parts. In this embodiment, an electronic switch lock 120 is activated by key 122 and issues an electronic signal indicating that the lock is to be opened. Such electronic switch locks are well known in the art and have been extensively used in automobiles. The electronic switch lock is connected to an OR gate 124 which also is connected to the optical port and antenna signal receiving unit of the electromagnetically activated lock mechanism 126 and 41, respectively, through OR gate 125. The OR gate transmits an electronic signal to unlatch the lock upon receipt of a signal from either the electronic switch lock 120 or the signal receiving unit 126.

As indicated previously, an important aspect of this invention is the recognition that many elements already included in typical electronic watches, such as the digital display panel and some function operations, can be used for the dual purpose of telling time and opening locks. Of course, it is recognized that the invention may be incorporated into other electronic devices which include many of the functions and integrated circuitry of the modern, electronic watch. State-of-the-art reliability in present day solid state electronics, including optical emitters and photodetectors, makes the electronic locking system more reliable, secure and convenient than present mechanical locking devices.

Also, while the invention has been exemplified with respect to two forms of electromagnetic radiation, light and radio, it is understood that other forms of electromagnetic radiation, notably microwaves, can be used to transmit the encoded signal.

While the present invention has now been described in terms of certain preferred embodiments and exemplified with respect thereto, one skilled in the art will readily appreciate that various modifications, changes, omissions and substitutions may be made without departing from the spirit thereof. It is intended, therefore, that the present invention be limited solely by the scope of the following claims.

I claim:

1. An electronically actuated locking system comprising a signal transmitting unit energized by a self-contained power source; said signal transmitting unit comprising first electromagnetic radiation emitting means, other than light emitting means, a first controller which activates said electromagnetic radiation emitting means so as to transmit an encoded electromagnetic signal, other than an optical signal, to a signal receiving unit, said first controller including a first programmable memory unit for storing data corresponding to a plurality of different encoded signals and means for entering said data into said first memory unit, said signal receiving unit comprising first means for receiving said encoded electromagnetic signal, means for comparing a received encoded signal to one or more codes contained in a second programmable memory unit capable of storing data corresponding to a plurality of different encoded signals, means for entering said data into said second memory unit and means for deactivating a lock mechanism when said encoded signal matches one of said one or more codes contained in said second memory unit.

2. An electronically actuated locking system as claimed in claim 1, further comprising second electromagnetic radiation emitting means in said signal transmitting unit and second means for receiving an encoded electromagnetic signal in said signal receiving unit.

3. An electronically actuated locking system as claimed in claim 1, wherein said first electromagnetic radiation emitting means comprises a radio frequency oscillator.

4. An electronically actuated locking system as claimed in claim 2, wherein said second electromagnetic radiation emitting means comprises light emitting means.

5. An electronically actuated locking system as claimed in claim 1, wherein said first means for receiving said encoded electromagnetic signal comprises a radio receiver.

6. An electronically actuated locking system as claimed in claim 4, wherein said second means for receiving an encoded electromagnetic signal comprises a photodetector.

7. An electronically actuated locking system as claimed in claim 6, wherein said first controller actuates both first and second electromagnetic radiation emitting means so as to transmit encoded electromagnetic signals at different frequencies in the electromagnetic spectrum.

8. An electronically actuated locking system as claimed in claim 7, wherein said means for comparing a received encoded signal to one or more codes contained in a second programmable memory unit compares both signals received by said first and second receiving means.

9. An electronically actuated locking system as claimed in claim 1, wherein said signal receiving unit further comprises a non-programmable memor unit responsive to a single encoded signal so as to deactuate lock mechanism when said single encoded signal is received by said signal receiving unit.

10. An electronically actuated locking system as claimed in claim 9, wherein said memory units are non-volatile memory units.

11. An electronically actuated locking system as claimed in claim 2, wherein said lock mechanism can be deactuated by an encoded electromagnetic signal or by key means.

12. An electronically actuated locking system as claimed in claim 11, wherein said lock mechanism is deactuated by an encoded electromagnetic signal received by said signal receiving unit or by a key activated electronic switch.

13. An electronically actuated locking system as claimed in claim 1, wherein said second memory unit is programmable by an encoded electromagnetic signal transmitted by said signal transmitting unit.

14. An electronically actuated locking system as claimed in claim 1, wherein said second memory unit is programmable by means other than said signal transmitting unit.

15. An electronically actuated locking system as claimed in claim 14, wherein said means for programming said second memory unit comprises a data link controlled from a central location.

16. An electronically actuated locking system as claimed in claim 15, wherein said data link is connected to second memory units in a plurality of signal receiving units.

17. An electronically actuated locking system as claimed in claim 15, wherein said data link is connected to a central processor and transmits each actuation of said lock mechanism to said central processor for recordation.

18. An electronically actuated locking system as claimed in claim 17, wherein said central processor deactivates a security system, upon receipt of said transmission of actuation of said lock mechanism.

19. An electronically actuated locking system as claimed in claim 1, wherein said first memory unit contains data for generating a fixed emergency signal which upon transmission from said signal transmitting unit is capable of being received by any of a plurality of receivers within receiving distance of the signal transmitting unit.

20. An electronically actuated locking system as claimed in claim 1, further comprising display means on said signal transmitting unit for displaying numbers corresponding to an encoded signal as the data corresponding to the encoded signal is entered into the first memory unit.

* * * * *